(12) United States Patent
Friedman

(10) Patent No.: US 6,549,582 B1
(45) Date of Patent: Apr. 15, 2003

(54) METHOD AND APPARATUS FOR COMBINING TRANSPONDERS ON MULTIPLE SATELLITES INTO VIRTUAL CHANNELS

(75) Inventor: Robert F. Friedman, Fayetteville, AR (US)

(73) Assignee: Virtual Satellite, Inc., Fayetteville, AR (US)

( * ) Notice: Subject to any disclaimer, the term of this patent is extended or adjusted under 35 U.S.C. 154(b) by 0 days.

(21) Appl. No.: 09/723,877

(22) Filed: Nov. 28, 2000

Related U.S. Application Data

(63) Continuation of application No. 09/243,910, filed on Feb. 3, 1999, now Pat. No. 6,154,501.
(60) Provisional application No. 60/073,619, filed on Feb. 4, 1998, and provisional application No. 60/113,693, filed on Dec. 24, 1998.

(51) Int. Cl.[7] ............................. H04B 3/36; H04B 7/17; H04L 27/28
(52) U.S. Cl. .................... 375/260; 375/211; 375/267; 455/13.1; 455/61
(58) Field of Search .................... 455/13.1, 12.1, 455/61, 59, 101, 132, 137, 139; 375/260, 267, 211, 295, 347, 316, 299; 370/316, 480, 315

(56) References Cited

U.S. PATENT DOCUMENTS

| | | | | |
|---|---|---|---|---|
| 4,733,402 A | * | 3/1988 | Monsen ..................... 375/232 |
| 4,901,307 A | | 2/1990 | Gilhousen et al. ............ 370/18 |
| 4,972,434 A | * | 11/1990 | Le Polozec et al. ........ 375/232 |
| 5,233,626 A | | 8/1993 | Ames ........................... 375/1 |
| 5,410,731 A | | 4/1995 | Rouffet et al. ............. 455/13.1 |
| 5,495,258 A | | 2/1996 | Muhlhauser et al. ........ 343/753 |
| 5,504,783 A | * | 4/1996 | Tomisato et al. ........... 370/482 |
| 5,592,471 A | * | 1/1997 | Briskman .................... 375/130 |
| 5,625,876 A | | 4/1997 | Gilhousen et al. ......... 455/33.3 |
| 5,642,358 A | * | 6/1997 | Dent .......................... 455/13.3 |

(List continued on next page.)

FOREIGN PATENT DOCUMENTS

| EP | 99908092 | 2/1999 | |
|---|---|---|---|
| WO | WO 99/40693 | 8/1999 | ........... H04B/7/185 |

Primary Examiner—Temesghen Ghebretinsae
(74) Attorney, Agent, or Firm—Gray Cary Ware & Freidenrich LLP

(57) ABSTRACT

A satellite communications system provides an information channel between remotely located transmitters and receivers. A virtual satellite system provides the same service, but divides the signal either in power or in data content into subchannels such that any particular signal is conducted to the intended receiver via a plurality of traditional satellite channels. The receiving terminal accepts the plurality of signals simultaneously from a possible plurality of satellites, combining the subchannels comprising the virtual channel into the original signal content as if conducted via a single channel. The receiving antenna system receives satellite subchannel signals from a plurality of directions using multiple antennas or a single antenna with multi-direction capability. Prior to signal combining, the receiver necessarily time-synchronizes the plurality of subchannels by introducing time delay in some channels before combining the subsignals into the original composite. A timing signal present in the virtual satellite system assists the receiver in determining the amount of delay to apply to each incoming signal. The timing signal is either a separate carrier or an additional modulation on the existing information-bearing carrier.

14 Claims, 4 Drawing Sheets

U.S. PATENT DOCUMENTS

| | | | |
|---|---|---|---|
| 5,720,039 A | 2/1998 | Lieberman | 455/10 |
| 5,745,839 A | 4/1998 | Lieberman | 455/10 |
| 5,758,261 A | 5/1998 | Wiedeman | 455/13.1 |
| 5,781,845 A * | 7/1998 | Dybdal et al. | 455/103 |
| 5,790,939 A | 8/1998 | Malcolm et al. | 455/13.2 |
| 5,859,874 A * | 1/1999 | Wiedeman et al. | 370/320 |
| 5,867,109 A | 2/1999 | Wiedeman | 340/827 |
| 5,987,037 A * | 11/1999 | Ganes | 455/103 |
| 6,067,442 A | 5/2000 | Wiedeman et al. | 455/13.1 |
| 6,154,501 A * | 11/2000 | Friedman | 375/211 |

* cited by examiner ically recombined in the receiver to reconstruct the
original signal satisfactorily. Hereinafter this second division method is referred to as content-division.

METHOD AND APPARATUS FOR COMBINING TRANSPONDERS ON MULTIPLE SATELLITES INTO VIRTUAL CHANNELS

CROSS-REFERENCES TO RELATED APPLICATIONS

This application is a continuation of U.S. patent application Ser. No. 09/243,910 filed Feb. 3, 1999, now U.S. Pat. No. 6,154,501.

BACKGROUND OF THE INVENTION

The invention relates to satellite communications systems generally, and more particularly to satellite communication systems which divide the transmitted signal, either in power or in content, to be synchronized and recombined in the receiving terminal. This concept applies readily to broadcast applications, but it not so limited.

The satellite industry has experienced a progression of performance enhancements evidenced by increased transmit power capability of satellite transponders, improved low-noise amplifier (LNA) characteristics, and smaller receiving antennas. In satellite systems with a large number of receiving stations, it is particularly important to reduce the cost of each receiving unit and to design a system with a small receiving antenna to meet installation and aesthetic requirements. The need for a small receiving antenna has motivated an increase in transponder power output in order to maintain an acceptable signal-to-noise ratio (SNR) with the smaller antenna. As satellite users move from lower power transponders to higher power transponders, falling demand for the lower power transponders reduces the cost of their use. Receiving a signal from a lower power transponder with the smaller receiving antenna size produces a received power at the LNA too low to maintain SNR requirements. The present invention permits the receiver to combine received signals from a plurality of transponders, possibly located on a plurality of satellites to enable again the use of lower power transponders, but with small receiving terminal antennas.

SUMMARY OF THE INVENTION

A satellite communications system includes a transmitting station that directs information-carrying signals toward an orbiting satellite, which receives the signals and in turn retransmits the signals on a different frequency band toward a plurality of receiving terminals. The satellite contains a transponder which receives signals as a broad band of frequencies and retransmits them on another set of frequencies of equal bandwidth but shifted to another location in the spectrum.

The present invention has as its object a satellite communications system including a transmitting facility that divides the signal into a plurality of subchannels directed toward a plurality of transponders located on one or more satellites and a receiving terminal that receives the subchannels, time-synchronizes the subchannels, and combines them into a faithful replica of the original composite signal. The division of the signal into subchannels is carried out by one of two methods. In a first division method, the source signal is replicated across the plurality of transponders. Hereinafter the first division method is referred to as power-division. In a second division method, the content of the source signal is represented by a set of distinct subsignals, each of which subsignals contains less information as the original signal, but said distinct subsignals can be conveniently recombined in the receiver to reconstruct the original signal satisfactorily. Hereinafter this second division method is referred to as content-division.

In a system using power-division to create subchannels, the originating transmitter directs more than one identical signal to a plurality of transponders, possibly located on a plurality of satellites. In said system, transponders retransmit and the receiving antenna system conducts all of the aforementioned signals into the receiving system. The receiving terminal provides means of time-synchronizing the plurality of received signals, adjusts the relative power level of the plurality of received signals to be approximately equal, and combines the signals into a composite via a signal adding process. Each of the signals added contains both an information component and a random noise component, such noise having been introduced primarily in the first amplifier of the receiver, typically a low-noise block converter (LNB). Those skilled in the art know that the information component of each signal will be statistically correlated, but the noise components will be statistically uncorrelated, both to each other and to the information component. Thus the information components will add linearly into the composite signal, that is in proportion to their number. The power in the information component of the composite signal will then be in proportion to the square of the number of received signals being added together. In contrast, the power in the noise component of the composite signal will be in proportion to the number of received signals added together. Thus the SNR of the composite signal is improved over the SNR of the individual subchannel signals by a factor of N in power, where N is the number of channels added together to form the composite signal. The foregoing discussion assumes that the signal levels and noise levels in each of the subchannel signals is identical.

In a real system, transmission characteristics will vary slightly between subchannels, signal and noise levels being slightly different between subchannels, resulting in an SNR improvement ratio somewhat less than the factor of N described above. In any case, the receiver may require automatic means of adjusting the power of each of the signals to be added at the combining point so as to be approximately equal to each other in level.

In a system using content-division to create subchannels, the originating transmitter directs distinct subsignals toward the plurality of transponders, the subsignals being created in such a way as to permit convenient reconstruction of the original signal at the receiving terminal. In an exemplary analog system, the original signal can be divided into subband signals using a filter-bank process. If the filters used satisfy quadrature-mirror properties, the subsignals can be added directly to reproduce the original signal without phase distortion at the boundary frequencies. If the analog signal contains a strong periodic timing component (as does a television signal), this periodic timing component can be separated from the remainder of the signal before dividing the signal into subband components. Said timing component could then be added back to each of the subband components to produce subchannel signals with different frequency components, but common timing information. This strategy naturally provides timing information useful to facilitate the necessary time-resynchronizing process in the receiver.

As above, in a system using content-division to create subchannels, the originating transmitter directs distinct subsignals toward the plurality of transponders, the subsignals being created in such a way as to permit convenient reconstruction of the original signal at the receiving terminal. In an exemplary digital system, the original binary signal can be divided into subchannel digital signals, each of which has a bit rate less than the original digital signal. The original digital signal can be divided into subchannel digital signals in any number of ways. Two simple exemplary digital subchannel strategies are as follows. A first exemplary digital subchannel strategy is to direct each successive bit into each subchannel sequentially. A second exemplary digital subchannel strategy is to direct each fixed-size block of bits in the original signal to each successive subchannel sequentially. This second exemplary strategy fits well with digital source signals that are organized in a fixed-block-size structure in the original signal.

In the case that a plurality of satellites is used to conduct a set of subchannels from a transmitting station to a given receiving terminal, each subchannel will generally experience a different propagation delay. The instant invention provides means to determine the amount of time to delay each subchannel in order to combine them synchronously. The delay required for each received subchannel will in the general case differ. The present invention provides additional means to implement the aforedetermined delay for each subchannel independently.

The receiving terminal system, when activated for a particular virtual channel, determines the relative delay between the subchannel signals arriving at the receiver. This could be accomplished by correlating the subchannel signals with each other at all possible delays expected in a particular implementation of the system. As this process is very time consuming and source signal dependent, it is therefore subject to false synchronization and possible failure to synchronize at all, particularly if the source signal does not contain enough timing information. The present invention solves this problem by transmitting a timing signal along with the original signal. Said timing signal arrives at the receiving terminal via a plurality of propagation paths, each experiencing a different delay. The timing signal is added to the virtual satellite system in such a way so as to be separable from the original signal on each subchannel. The receiving terminal then correlates timing signals arriving on different subchannels to determine the amount of relative propagation delay. All subchannel signals contain common timing information to facilitate the correlation process. This guarantees that the subchannels can be processed and compared in a known way to determine relative propagation delay.

The timing signal can be added to the virtual satellite channel using one of two exemplary methods, but the instant invention is not so limited. A first exemplary method requires that a narrow bandwidth signal be transmitted across each satellite in the virtual channel. The narrow band signal requires a small allocation of the available spectrum, but provides a dedicated timing signal on each satellite actively carrying virtual satellite channels. The narrow band timing signal provides propagation delay information to virtual channel receiving terminals having one or more subchannels on the satellite. The timing signal could consist of one or more of the following exemplary signals, but the instant invention is not so limited. A first exemplary signal is a carrier modulated digitally by a binary pseudorandom noise sequence. A second exemplary signal is a periodic pulse. The pulse could be time-dispersed prior to transmission to create a signal with improved peak to average waveform properties. The receiving terminal in this example would reverse the time-dispersal process to recover a narrow-time pulse. The time period of either exemplary signal above described, after which the signal repeats, would be longer than twice the greatest expected delay difference between subchannels, thus facilitating unambiguous determination of propagation delay.

A second exemplary method of incorporating a timing signal in the virtual satellite system consists of adding a spread spectrum component to each of the information-bearing subchannels in the system, and within the bandwidth of each subchannel. The magnitude of the spread spectrum timing component is much lower than the information signal so as not to reduce the performance of the normal receiver demodulation process. The spread spectrum signal is then despread in the receiving terminal, thereby increasing its magnitude above that of the information content. The increase in signal level is proportional to the processing gain. This process facilitates delay synchronization in the receiving terminal and has two advantages. A first advantage is that the second exemplary method does not increase the bandwidth requirements of the virtual channel to accommodate a timing signal. A second advantage is that the full bandwidth of the information channel is available to the timing signal resulting in high resolution relative delay estimation.

DESCRIPTION OF THE INVENTION

Figure 1:
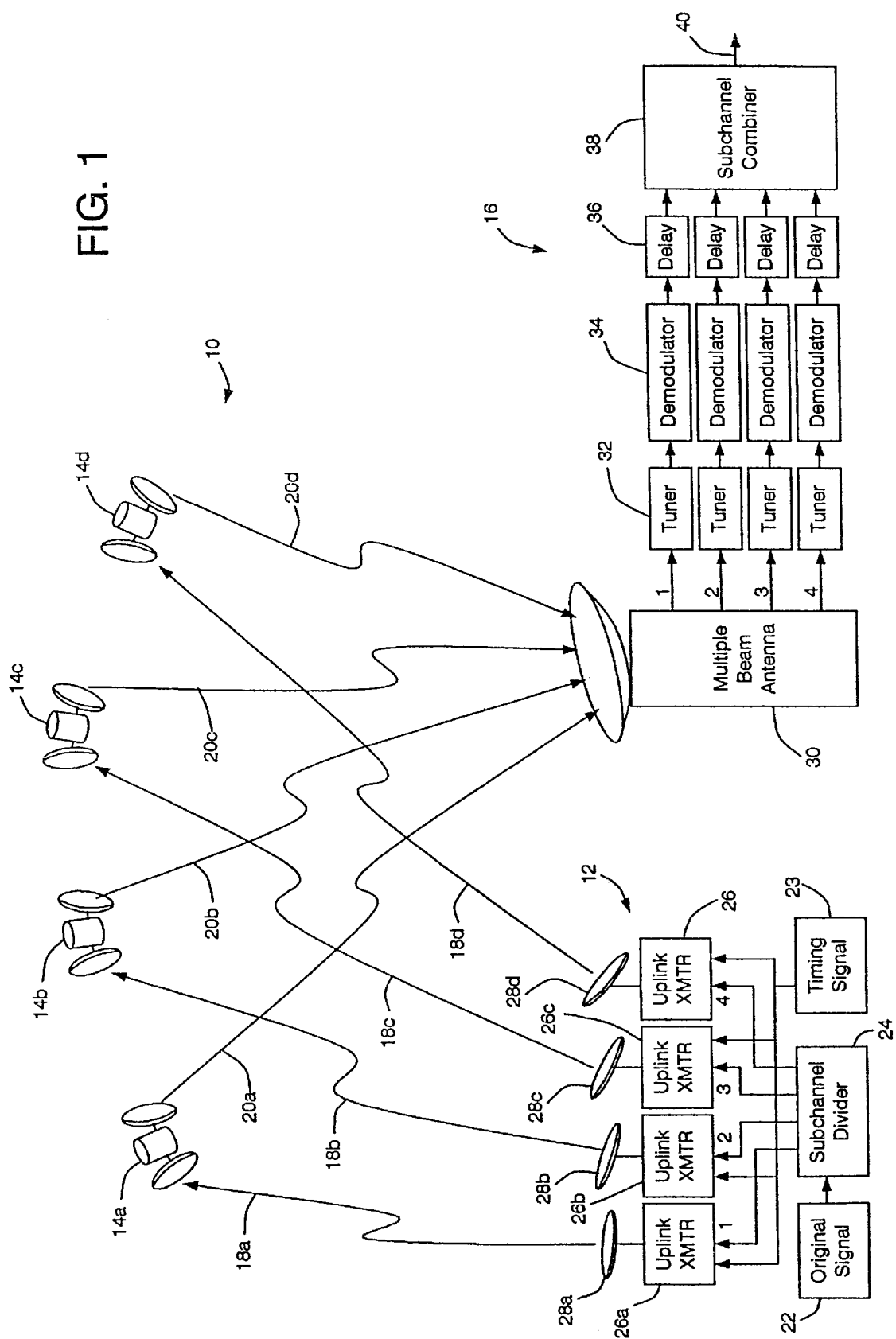
FIG. 1 is a schematic and block diagram illustrating the present invention.

Referring now to the drawings in which like reference numerals indicate like or corresponding elements over the several views, FIG. 1 shows an overview of the satellite communications system consisting of subsystems 12, 10, 16. Original signal 22 feeds subchannel divider 24 which separates the signal into a plurality of numbered subsignals. The exemplary system of FIG. 1 shows the number of subsignals to be four, but the present invention is not so limited. Subchannel divider 24 creates the subsignals by dividing original signal 22 employing one of two methods. A first method divides the signal on the basis of power. In this first method all the subchannel signals emerging from subchannel divider 24 are identical. A second method divides the signal on the basis of content. In this second method, each subchannel signal carries at least some information that is not carried by the other subchannels. The information content may be mutually exclusive or may overlap between subchannels, but in any case the subchannel signals under the second divider method are not identical as in the first method. Each subchannel signal feeds an uplink transmitter 26a–26d, each of which uplink transmitters feeds a separate antenna 28a–28d, directing radio frequency energy toward a plurality of orbiting satellites 14a–14d via propagation paths 18a–18d. Uplink transmitters 26a–26d add timing signal 23 to the signal to be transmitted either on a separate frequency allocation or in the bandwidth of the information-bearing carrier.

The exemplary system of FIG. 1 shows the number of satellites used by the system to be four, but the instant invention is not so limited. Each satellite 14a–14d receives a band of frequencies, amplifies the signals received in that band, and retransmits the band at a different location in the spectrum. Each of said satellites has a transmitting antenna pattern that includes receiving terminal system 16. Propagation paths 20a–20d from each satellite 14a–14d to representative receiving terminal 16 carry radio frequency energy from satellites 14a–14d to the receiving terminal system 16. It should be understood that although FIG. 1 depicts each uplink signal being carried by a different satellite, the present invention is not so limited. For example, transponders of satellites 14a, 14b could be collocated on the same satellite. In this case, uplink transmitters 26a, 26b and uplink antenna systems 28a, 28b could be combined, in addition to satellites 14a, 14b representing the same satellite. Propagation paths 18a, 20a, 18b, 20b in this case would be combined into single uplink and downlink propagation paths. Receiving terminal system 16 incorporates one of two antenna methods. A first method includes a plurality of antenna components to receive the plurality of satellite signals 20a–20d. A second method incorporates a multiple beam antenna. The exemplary system of FIG. 1 uses multiple beam antenna 30, but the present invention is not so limited. In either of the aforementioned receiving terminal antenna methods, the antenna subsystem produces a plurality of output signals corresponding to the subchannel signals emerging from subchannel divider 24 in uplink system 12. In the exemplary system of FIG. 1, each of the numbered signals emerging from multiple beam antenna 30 correspond to similarly numbered signals emitted by subchannel divider 24. This signal identity remains true whether satellites 14a, 14b of FIG. 1 are distinct or represent the same satellite as indicated in the foregoing description. The subchannel signals emitted by multiple beam antenna 30 feed a plurality of tuners 32 which then drive a plurality of demodulators 34. A signal emerging from one of the demodulators 34 then represents a version of the corresponding output of subchannel divider 24, but delayed in time in proportion to the sum of the lengths of the corresponding uplink and downlink propagation paths 18 and 20. In receiving terminal 16, delay component 36 further delays first-arriving signals such that all the subchannel components arrive at subchannel combiner 38 at nearly the same time. Said combiner 38 produces a reconstruction 40 of original signal 22. The method used in subchannel combiner 38 is consistent with and corresponds to the method used to divide original signal 22 in subchannel divider 24.

DIGITAL CONTENT-DIVISION

Figure 2:
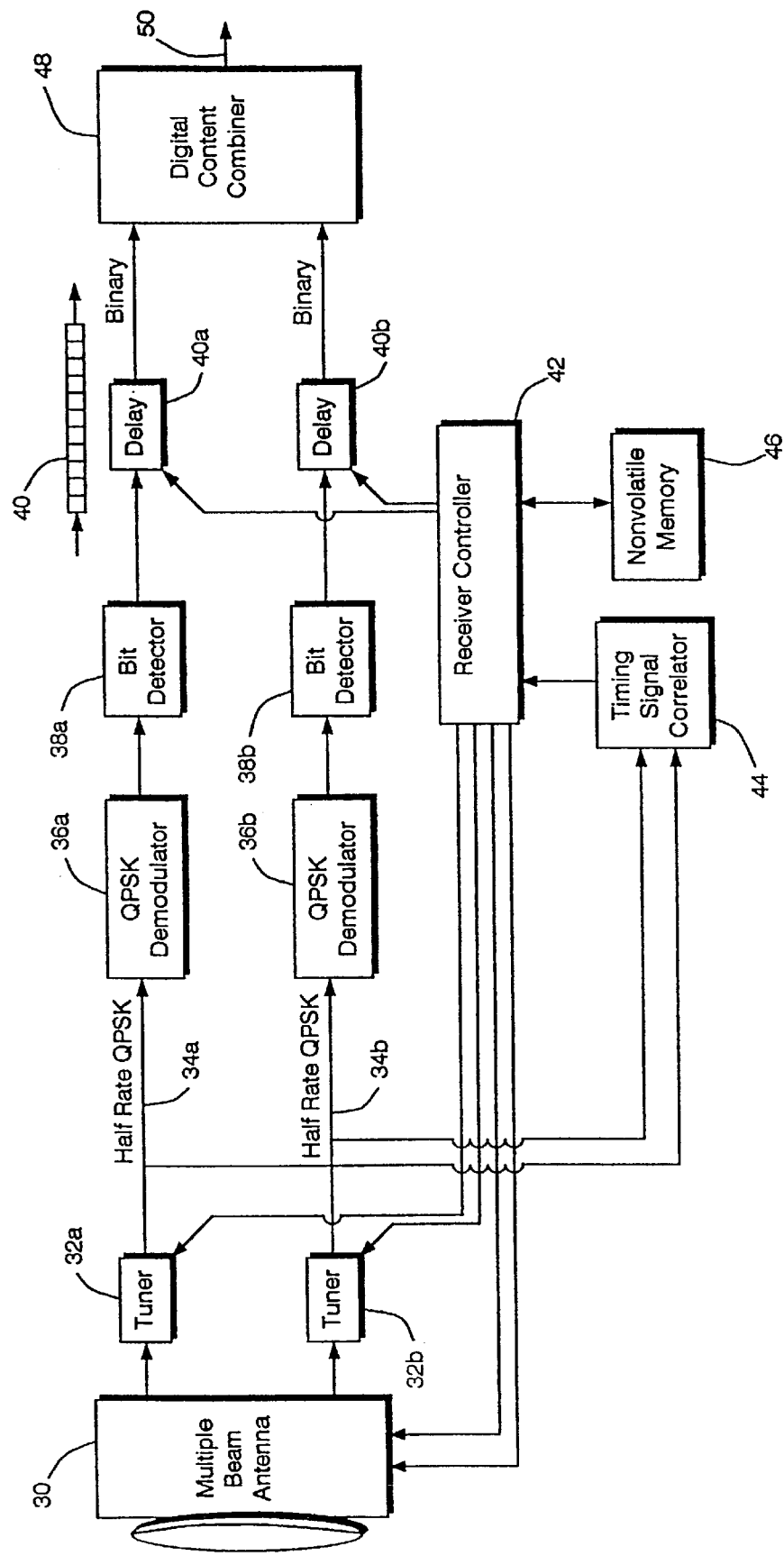
FIG. 2 is a schematic and circuit block diagram of one embodiment of the present invention.

The instant invention uses one of three methods to affect the dividing and combining operations of subchannel divider 24 and subchannel combiner 40. In each of said methods, subchannel divider 24 of FIG. 1 feeds a plurality of uplink transmitters 26a–28b, but the signals emerging from subchannel divider 24 are different in nature depending of the dividing and combining method used. In a first dividing and combining method, original signal 22 is digital. In said first method, subchannel divider 24 divides said digital signal into lower data rate subchannel signals with binary content that contains at least some mutually exclusive information. The division could be on a sequential bit-by-bit basis, could be on a sequential frame-by-frame basis, and may or may not relate to possible framing in the original digital signal. The exemplary receiving terminal 16 of FIG. 2 depicts a two-subchannel digital receiving system where the radio frequency carriers feeding the demodulators 36a and 36b are quaternary phase shift keying (QPSK) modulated signals, but the present invention is not so limited. Said figure further indicates the use of a multiple beam antenna 30, but the present invention is not so limited. Referring again to FIG. 2, multiple beam antenna 30 emits first and second signals into first and second tuners 32a and 32b. Each tuner shifts a band of higher frequencies to a band of lower frequencies of equal bandwidth such that receiver controller 42 sets the center frequency of the higher band, but the lower band is fixed. Tuners 32a, 32b emit QPSK modulated signals at a frequency that the QPSK demodulators 36a, 36b expect to receive. As there are two subchannels in the example of FIG. 2, the data rate of the binary information contained in these QPSK signals is approximately half the data rate of original signal 22. The respective outputs of QPSK demodulators 36a, 36b emit signals to bit detectors 38a, 38b which in turn produce streams of binary data corresponding to the subchannel division in uplink system 12. Delay operators synchronize the data streams by introducing delay in the first-arriving binary stream such that there is a minimum of relative delay between the respective delay operator outputs. Digital content combiner 48 reverses the content division process of subchannel divider 24 so as to produce at its output a faithful delayed replica 50 of original digital signal 22. Receiver controller 42 of FIG. 2 responds to user input (not depicted) to select the transponders 14 to combine, subsequently emitting control signals to multiple beam antenna 30 to direct its antenna patterns toward the satellites containing selected transponders 14. Receiver controller 42 also selects each tuner frequency consistent with the signals emitted from the selected transponder. Receiver controller 42 further processes information from timing signal correlator 44 to determine the correct setting of delays 40a, 40b. Timing signal correlator 44 receives and time-correlates tuner outputs 34. For a system with more than two subchannels, correlator 44 processes tuner outputs in pairs to determine relative delay between subchannels. Nonvolatile memory 46 contains parameters regarding the user-selected transponders to enable the correct setting of multiple beam antenna 30 and tuners 32.

DIGITAL POWER-DIVISION

Figure 3:
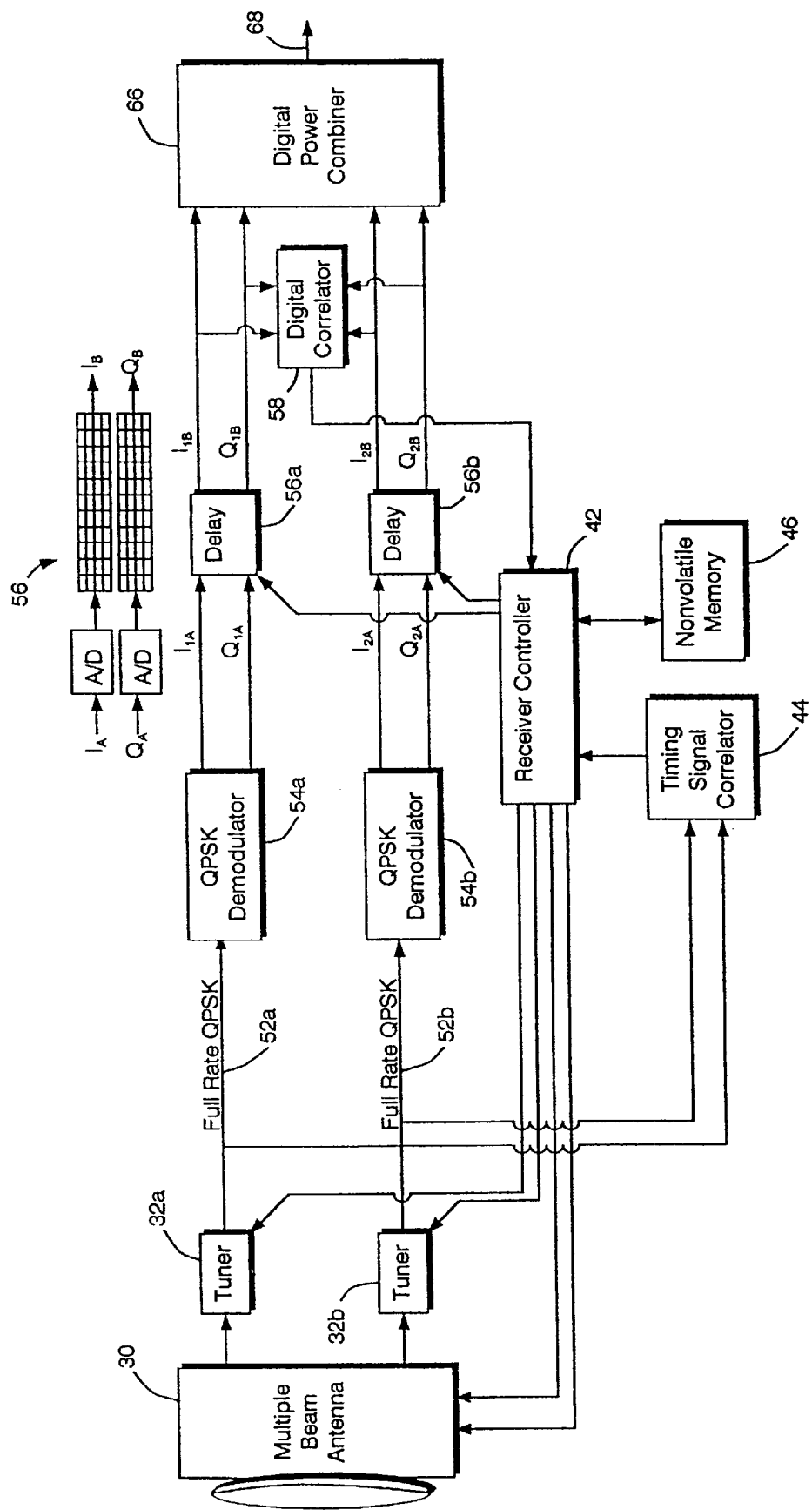
FIG. 3 is a schematic and circuit block diagram of another embodiment of the present invention.

The instant invention can use a second method for transporting a digital signal across a virtual satellite channel. Referring to FIG. 3 which depicts an example of said second method which combines delayed demodulator outputs from identical subchannels as described previously as power combining. Under the direction of receiver controller 42, multiple beam antenna 30 emits signals to tuners 32a, 32b which translate variable transponder bands into a fixed band of frequencies expected by the QPSK demodulators 54. FIG. 3 depicts a receiving terminal using a multiple beam antenna, but the present invention is not so limited. FIG. 3 further depicts a receiving terminal with two subchannels, but the instant invention is not limited to two subchannels. The figure in addition shows the use of a QPSK modulation scheme, but the instant invention is not so limited. Subchannel signals 52 emitted by tuners 32 contain identical digital information transmitted at the full rate of original signal 22. QPSK demodulators 54 produce soft decision outputs $I_A$ and $Q_A$ for each subchannel. Since the total propagation delay for each subchannel is in general different, first-arriving soft decisions must be delayed in time by an amount such that soft decisions emitted by delays 56 emerge with nearly zero relative delay between subchannels. Delays 56 digitize the analog soft decisions produced by demodulators 54, placing digitized results in a first-in first-out (FIFO) buffer. Receiver controller 42 controls the amount of time delay in delays 56 with input from timing signal processor 44 and digital correlator 58. Timing signal processor 44 analyzes input from tuner outputs 52 to determine the relative time delay between subchannels. For systems using more than two subchannels, the timing signal processor would process subchannel tuner outputs in pairs. Since the subchannels of FIG. 3 result from use of an uplink system 12 using power division, delay outputs $I_B$ and $Q_B$ from delays 56a, 56b are correlated. This enables digital correlator 58 to compare digitized soft decisions between subchannels and provide additional information to receiver controller 42 about relative subchannel delay at the bit level. Digital power combiner 66 processes synchronized I and Q soft decisions from all subchannels to produce a single I and Q decision 68 for every set of soft decisions presented. For the case of QPSK modulation, each final decision from combiner 66 produces two bits in digital output 68.

ANALOG DIVISION

Figure 4:
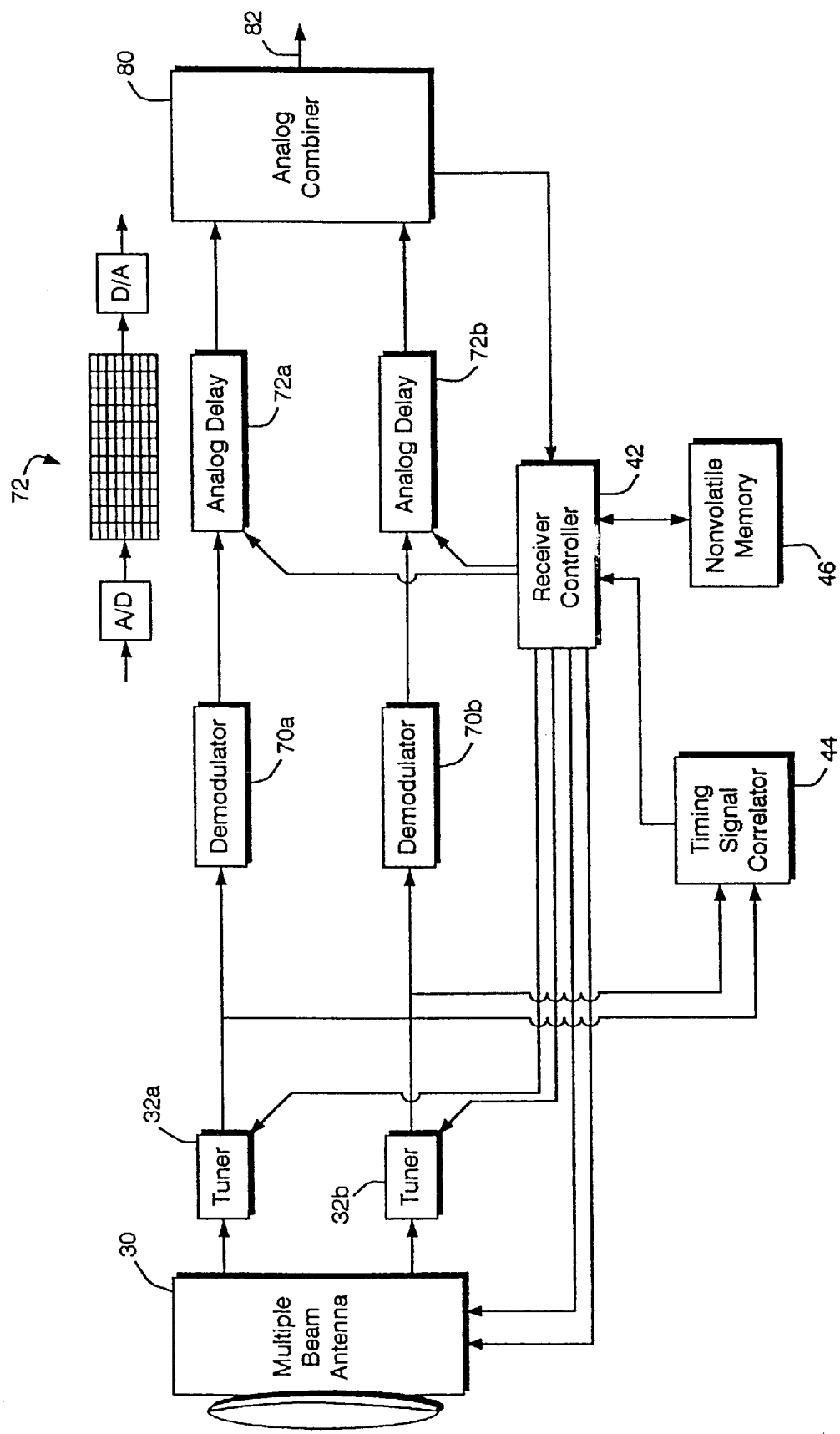
FIG. 4 is a schematic and circuit block diagram of another embodiment of the present invention.

A third method for dividing and combining the original signal address the case that original signal 22 is analog in nature. Referring to FIG. 4, receiver controller 42 directs multiple beam antenna 30 to point to selected transponder signals and directs tuners 32a, 32b to translate said transponder frequencies to a fixed band of frequencies expected by demodulators 70a, 70b. The exemplary system of FIG. 4 divides the signal into two subchannels, but the instant invention is not so limited. Demodulators 70a, 70b produce analog outputs signals which are faithful replicas of the subchannel signals produced by subchannel divider 24 in the uplink system 12. Said analog signal outputs in general experience relative delay due to differing lengths of total propagation paths when using transponders on different satellites. Under direction of receiver controller 42, analog delays 72 add delay to first-arriving subchannel signals so as to create outputs of analog delays 72 which arrive at analog combiner 80 with near zero relative delay. Analog delays 72 consist of a high quality analog-to-digital converter (A/D), a FIFO buffer, and a digital-to-analog (D/A) converter. Each delays 72 creates a time delay in proportion the instant size of the FIFO buffer contained therein. Delays 72 present output signals to analog combiner 80 which represent faithful replicas of the subchannel signals produced by subchannel divider 24 in the uplink system 12. These signals differ outputs of demodulators 70 in that they are now time synchronized. FIG. 4 represents both signal division strategies, power-division and content-division. In the first case of power-divided subchannel signals, inputs to analog combiner 80 represent identical signals, differing only in distortion and noise added by satellite transport. In a second case, time-synchronized content-divided subchannel signals arrive at analog combiner 80. Analog combiner 80 creates output 82 most likely by a simple addition process, but is not so limited. In addition to producing combined output signal 82, analog combiner 80 optionally provides a measure of time synchronization to receiver controller 42 to improve the accuracy of time alignment by controller 42. As in first and second digital divider-combiner methods, timing signal correlator 44 provides relative subchannel delay information to receiver controller 42, which together with further optional delay information from analog combiner 80 provides receiver controller 80 with a basis to create estimates of relative delay between subchannels which in turn affects the setting of delays 72.

TIMING

In first, second, and third divider-combiner methods, tuners 32 provide information to timing signal correlator 44 using one of two timing methods. In a first timing method, receiver controller 42 adjusts tuners 32 to receive timing signal 23 placed on all satellites with transponders used by the virtual satellite system. In this first method, tuner adjustment is necessary as the timing signals are placed at a frequency assignment separate form the information-bearing transponder signal. This out-of-band timing signal may be narrow-band in nature so as to conserve limited bandwidth on the satellite and reduce system cost. In general, timing signal 23 is unrelated to the information-bearing transponder signal in either information content, modulation strategy, or data rate or frame rate in the case of digital transmission, but the present invention is not so limited. The timing signal utilizes allocated bandwidth to enhance the resolution of relative subchannel delay estimation. Possibilities for the timing signals include pseudorandom noise, tone ranging, and time-dispersed pulse, but the instant invention is not so limited. A good timing signal must have a strong sharp cross-correlation with a time-shifted version of itself and have minimum spurious correlations. The instant invention includes two timing signal processor methods. In a first timing processor method, timing signal correlator 44 correlates output signals from tuners 32 at various relative delays until an acceptable correlation occurs indicating that the relative delay between the subchannels has been reproduced in timing correlator 44. Receiver controller 42 then sets analog delays 72 in accord with this measured relative delay to synchronize inputs to analog combiner 80. In the case that there are more than two subchannels in the virtual satellite channel, timing signal processor 44 compares subchannel signals pairwise. In a second timing processor method, timing signal correlator 44 correlates the output from each tuner 32 with a stored version of the known timing signal, or by processing the recovered timing signal through a process that will produce a periodic output in response to the timing signal. One example of such a process is a matched filter, but the present invention is not so limited. Once the delays 40, 56, 72 are adjusted to remove relative subchannel delay, tuners 32 are set to conduct the selected information-bearing transponder signals to the respective demodulators in FIG. 1, FIG. 2, FIG. 3.

In a second timing method, the timing signal is as wide in bandwidth as the information-bearing transponder and resides in exactly the same bandwidth. In order to prevent distortion of the information signal, the timing signal is greatly attenuated. In order to recover the attenuated timing signal, timing signal correlator 44 first processes the tuner outputs through a linear system that creates a large processing gain to amplify the expected timing signal above the output created by the presence of the uncorrelated information-bearing carrier. The instant invention may use one of three exemplary processes to recover a low-level in-band timing signal, but the present invention is not so limited. In a first exemplary process the timing signal is a time-dispersed pulse with precise time dispersion introduced by a surface acoustic wave (SAW) filter in timing signal generator 23. A matching SAW filter in receiving terminal 16 performs the inverse of the dispersion process, thus recovering the primary timing signal which is a periodic narrow-time pulse. In a second exemplary process, the timing signal is pseudorandom noise. Timing signal processor 44 then applies spread spectrum techniques to recover the timing of the low-level in-band timing signal. Upon timing signal acquisition, the correlated timing signal will experience a large process gain, but the uncorrelated information carrier will remain at the same relative level. This enables timing signal processor 44 to establish relative delay between subchannels, reporting results to receiver controller 42. A third exemplary timing process uses a multiple tone signal to establish timing. The sine waves selected are harmonically related in such a way as to create a signal with a relatively long period, but giving good time resolution with the presence of some high frequencies. A linear filter at the selected frequencies recovers the timing signal in favor of the information carrier. Timing signal processor 44 then analyzes filtered timing signals to establish relative time delay between subchannels.

In the case of the digital content-division receiver of FIG. 2, there is typically no correlation between the subchannels to provide feedback as to the accuracy of the delay settings of delays 40. This is a feedforward control system. Feedback is possible however in the exemplary systems of FIG. 3, FIG. 4. Outputs from delays 56 in the digital power-division receiver of FIG. 3 are highly correlated. If the delay setting is slightly in error, a local digital correlation reveals the necessary small correction. Outputs from delays 72 in the analog receiver of FIG. 4 are correlated to some extent depending on the nature of the analog division and the instant properties of the analog content. This provides optional feedback to receiver controller 42 to affect local timing corrections.

While several particular forms and variations thereof have been illustrated and described, it will be apparent that various modifications can be made without departing from the spirit and scope of the invention. Accordingly it is not intended that the invention be limited, except by the appended claims.

I claim:

1. A plurality of electrical subsignals for communication, wherein an electrical signal having a first bandwidth is divided into said plurality of electrical subsignals for transmission over a plurality of communication channels, wherein said plurality of electrical subsignals are embodied in a carrier wave, and each of said plurality of electrical subsignals has a bandwidth smaller than the first bandwidth, the plurality of electrical subsignals comprising some information unique to that subsignal so that said plurality of electrical subsignals may be identified and distinguished, wherein a common timing signal is added to said plurality of electrical subsignals within the bandwidth of each subsignal so that no additional bandwidth allocation is required to transmit the common timing signal and wherein said common timing signal is transmitted in a separate frequency allocation, so that a plurality of tuners receive the frequency-separated timing signal to measure relative propagation delay of the subsignals, the amount of delay in a plurality of delay means is set, and said plurality of tuners are redirected to receive the associated information-bearing subsignals;

whereby said plurality of electrical subsignals are received and combined for re-creating said electrical signal.

2. The plurality of electrical subsignals of claim 1 wherein frequencies of said plurality of electrical subsignals are translated to the frequency of a selected satellite transponder.

3. The plurality of electrical subsignals of claim 2 wherein said plurality of tuners translate the frequencies of said plurality of electrical subsignals to a fixed intermediate frequency.

4. The plurality of electrical subsignals of claim 3 wherein said plurality of electrical subsignals are demodulated for creating a plurality of bit streams corresponding to the information content of the associated subsignals.

5. The plurality of electrical subsignals of claim 4 wherein the information in each of said plurality of electrical subsignals are combined into a delayed reconstruction of the electrical signal.

6. A plurality of electrical subsignals for communication, wherein an electrical signal having a first bit rate is divided into said plurality of electrical subsignals for transmission over a plurality of communication channels, wherein said plurality of electrical subsignals are embodied in a carrier wave, and each of said plurality of electrical subsignals carries identical information at the same bit rate as the first bit rate, wherein the plurality of electrical subsignals comprises some information unique to that subsignal so that said plurality of electrical subsignals may be identified and distinguished, wherein a common timing signal is added to said plurality of electrical subsignals within the bandwidth of each subsignal so that no additional bandwidth allocation is required to transmit the common timing signal, and wherein said common timing signal subchannel is transmitted in a separate frequency allocation so that a plurality of tuners receive the frequency-separated timing signal to measure relative propagation delay of the subsignals, the amount of delay in a plurality of delay means is set, and said plurality of tuners are redirected to receive the associated information-bearing subchannels;

whereby said plurality of electrical subsignals are received and combined for re-creating said electrical signal.

7. The plurality of electrical subsignals of claim 6 wherein frequencies of said plurality of electrical subsignals are translated to the frequency of a selected satellite transponder.

8. The plurality of electrical subsignals of claim 7 wherein said plurality of tuners translate the frequencies of said plurality of electrical subsignals to a fixed intermediate frequency.

9. The plurality of electrical subsignals of claim 8 wherein said plurality of electrical subsignals are demodulated for creating a plurality of soft decisions in the form of digitized decision-confidence-values corresponding to the associated subsignals.

10. The plurality of electrical subsignals of claim 9 wherein the plurality of soft decisions are combined into a delayed reconstruction of the electrical signal.

11. A plurality of analog subsignals for communication, wherein an analog signal having a first power is divided into said plurality of analog subsignals for transmission over a plurality of communication channels, wherein said plurality of analog subsignals are embodied in a carrier wave, and each of said plurality of analog subsignals has a power smaller than the first power, wherein a common timing signal is added to said plurality of analog subsignals within the bandwidth of each subsignal so that no additional bandwidth allocation is required to transmit the common timing signal, the common timing signal being transmitted in a separate frequency allocation so that a plurality of tuners receive the frequency-separated timing signal to measure relative propagation delay of the subsignals, the amount of delay in a plurality of delay means is set, and said plurality of tuners are redirected to receive the associated information-bearing subsignals; and whereby said plurality of analog subsignals are received and combined for reconstruction of said analog signal.

12. The plurality of analog subsignals of claim 11 wherein frequencies of said plurality of analog subsignals are translated to the frequency of a selected satellite transponder.

13. The plurality of analog subsignals of claim 12 wherein said plurality of tuners translate the frequencies of said plurality of analog subsignals to a fixed intermediate frequency.

14. The plurality of analog subsignals of claim 13 wherein said plurality of analog subsignals are combined and demodulated for creating a delayed reconstructed analog signal corresponding to the information content of the analog signal.

* * * * *